(12) United States Patent
Scheuren

(10) Patent No.: US 10,799,329 B2
(45) Date of Patent: Oct. 13, 2020

(54) TOOTHBRUSH

(71) Applicant: J.G. Hambrock-Edition, Hamburg (DE)

(72) Inventor: Axel Scheuren, Buchholz (DE)

(73) Assignee: J. G. Hambrock-Edition, Hamburg (DE)

( * ) Notice: Subject to any disclaimer, the term of this patent is extended or adjusted under 35 U.S.C. 154(b) by 10 days.

(21) Appl. No.: 15/767,077

(22) PCT Filed: Oct. 7, 2016

(86) PCT No.: PCT/EP2016/074078
§ 371 (c)(1),
(2) Date: Apr. 9, 2018

(87) PCT Pub. No.: WO2017/060474
PCT Pub. Date: Apr. 13, 2017

(65) Prior Publication Data
US 2019/0069979 A1    Mar. 7, 2019

(30) Foreign Application Priority Data

Oct. 9, 2015    (DE) .................... 20 2015 105 354 U

(51) Int. Cl.
*A46B 11/04* (2006.01)
*A61C 17/22* (2006.01)
(Continued)

(52) U.S. Cl.
CPC .......... *A61C 17/227* (2013.01); *A46B 11/001* (2013.01); *A46B 11/002* (2013.01);
(Continued)

(58) Field of Classification Search
CPC . A46B 11/001; A46B 11/002; A46B 11/0003; A46B 11/0062; A46B 13/02;
(Continued)

(56) References Cited

U.S. PATENT DOCUMENTS

| 7,677,827 | B1 | 3/2010 | Manukian | |
|---|---|---|---|---|
| 8,529,150 | B2 * | 9/2013 | Olson | A46B 5/02 401/286 |
| 2006/0165473 | A1 * | 7/2006 | Hohlbein | A46B 5/0062 401/132 |
| 2011/0035011 | A1 | 2/2011 | Cain | |

(Continued)

FOREIGN PATENT DOCUMENTS

| AT | 505109 A1 | 10/2008 |
|---|---|---|
| CN | 2081671 U | 7/1991 |

(Continued)

OTHER PUBLICATIONS

PCT/EP/2016/074078; International Filing Date Oct. 7, 2016; International Preliminary Report on Patentability; dated Apr. 19, 2018 (14 pages).

*Primary Examiner* — Jennifer C Chiang
(74) *Attorney, Agent, or Firm* — Barclay Damon LLP

(57) ABSTRACT

A toothbrush comprises a handle section and a brush head. The handle section further comprises a channel having at least one outlet opening which is fluidly coupled to a toothpaste supply, wherein the toothpaste is conveyed from the toothpaste supply via the channel to the at least one outlet opening via a suction process carried out with a mouth of an user.

10 Claims, 9 Drawing Sheets

(51) Int. Cl.
*A46B 11/00* (2006.01)
*A46B 15/00* (2006.01)
*A46B 13/02* (2006.01)

(52) U.S. Cl.
CPC ...... *A46B 11/0003* (2013.01); *A46B 11/0062* (2013.01); *A46B 11/0065* (2013.01); *A46B 13/02* (2013.01); *A46B 13/023* (2013.01); *A46B 15/0061* (2013.01); *A46B 15/0069* (2013.01); *A46B 15/0095* (2013.01); *A46B 15/0097* (2013.01); *A46B 11/0041* (2013.01); *A46B 11/0075* (2013.01); *A46B 2200/1066* (2013.01); *A46B 2200/1073* (2013.01)

(58) Field of Classification Search
CPC .............. A46B 13/023; A46B 15/0095; A46B 15/0097; A46B 15/0061; A46B 15/0069; A46B 2200/1066; A46B 2200/1073
USPC .................................................. 401/280, 290
See application file for complete search history.

(56) References Cited

U.S. PATENT DOCUMENTS

| | | | | |
|---|---|---|---|---|
| 2015/0289635 | A1* | 10/2015 | Erskine-Smith | A46B 5/0095 15/143.1 |
| 2016/0081779 | A1* | 3/2016 | Lin | A61C 17/02 433/82 |
| 2017/0318950 | A1* | 11/2017 | Cope | A46B 11/001 |
| 2018/0035797 | A1* | 2/2018 | Mahawar | A46B 15/0061 |
| 2019/0216214 | A1* | 7/2019 | Manoah | A46B 11/001 |

FOREIGN PATENT DOCUMENTS

| | | |
|---|---|---|
| DE | 7416094 U | 5/1974 |
| DE | 9007098 U1 | 9/1990 |
| DE | 3925860 A1 | 2/1991 |
| DE | 29514599 U1 | 11/1995 |
| DE | 10023725 A1 | 11/2001 |
| DE | 202011002334 U1 | 6/2011 |
| WO | 2004/088547 A2 | 10/2004 |
| WO | 2011/035011 A2 | 3/2011 |

* cited by examiner

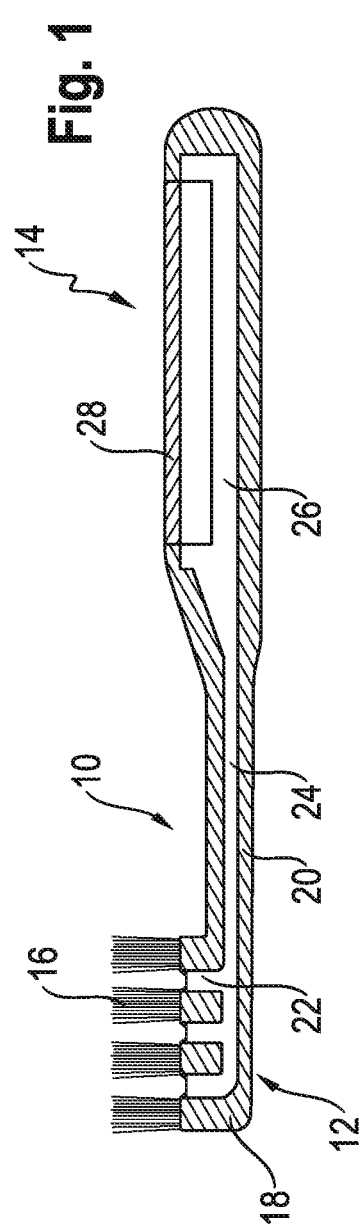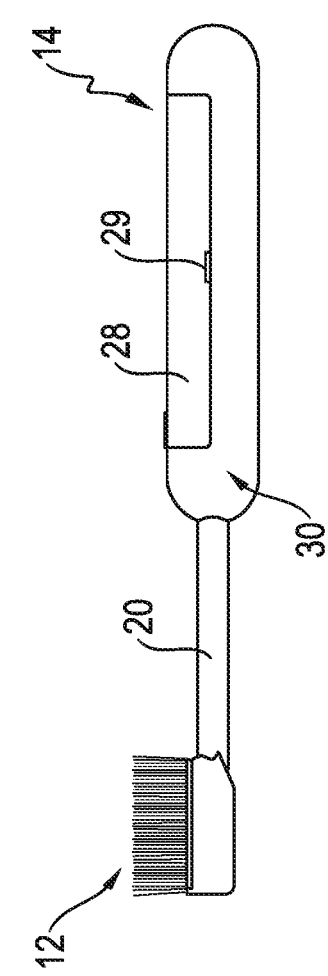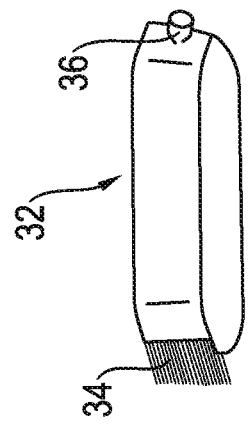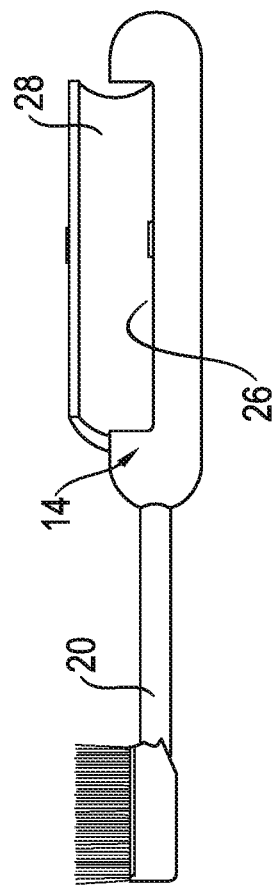

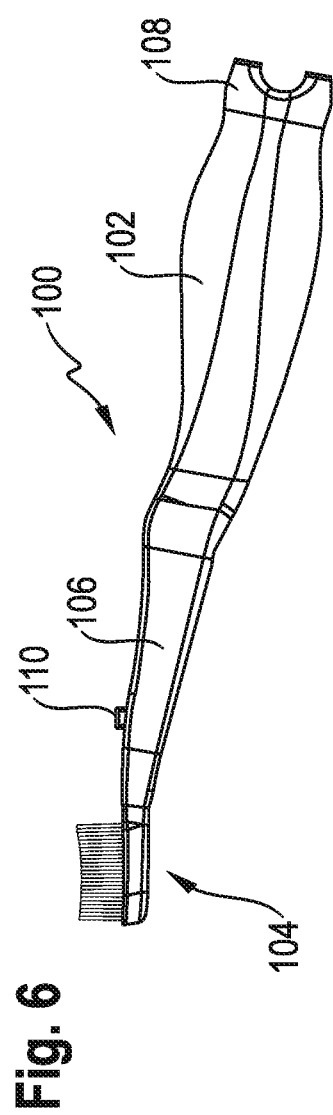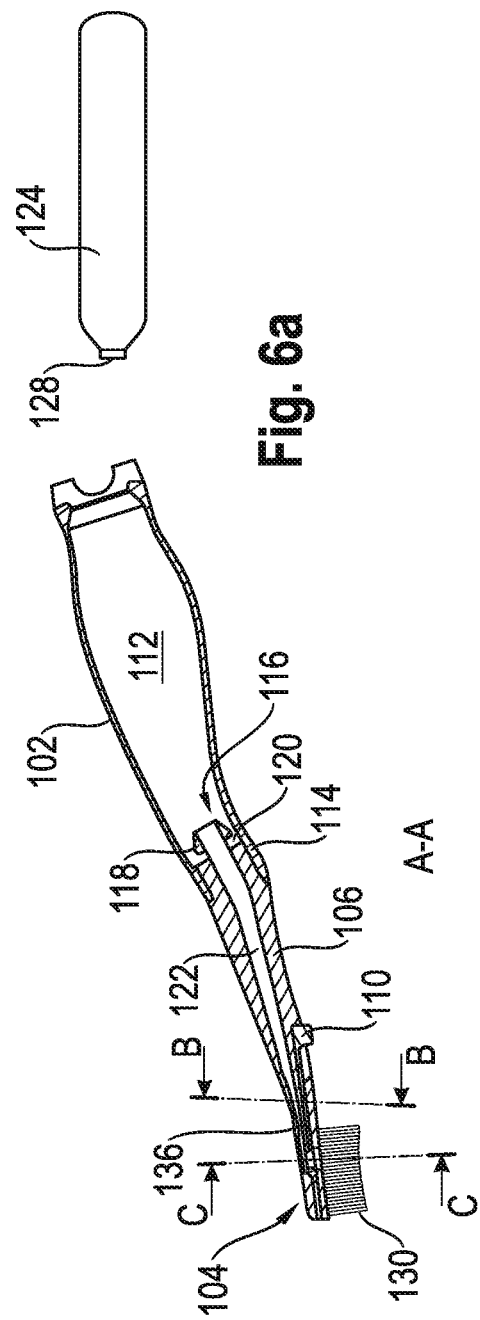

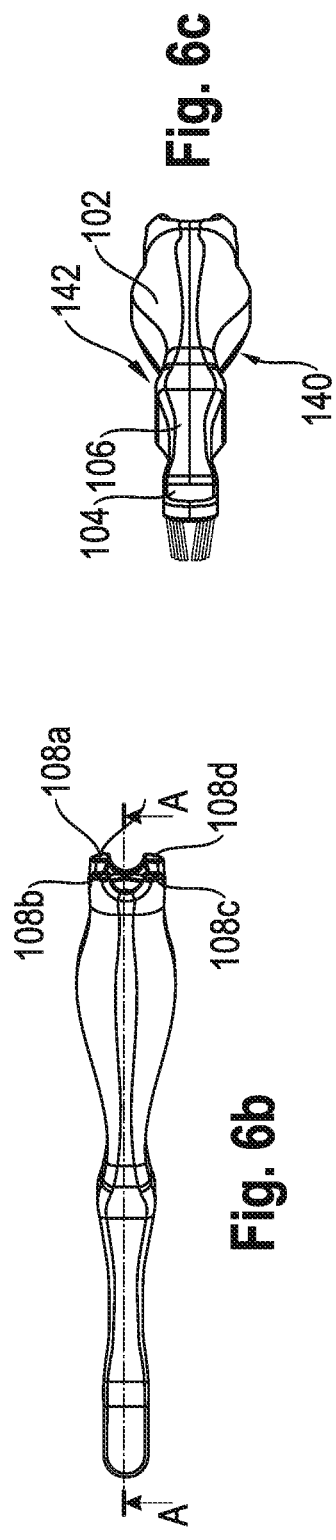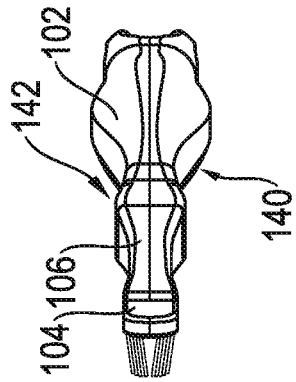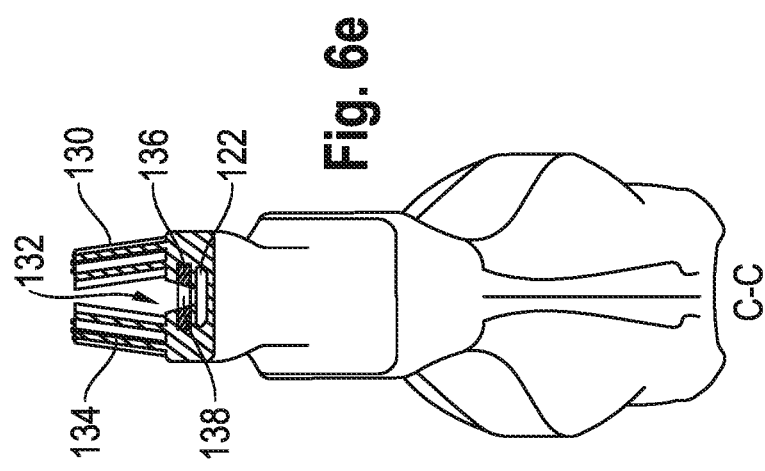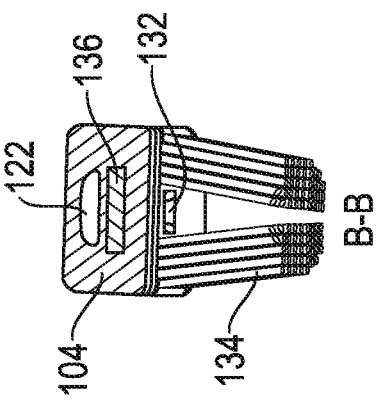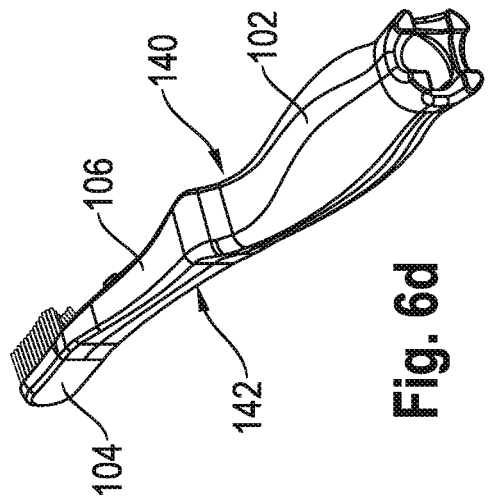

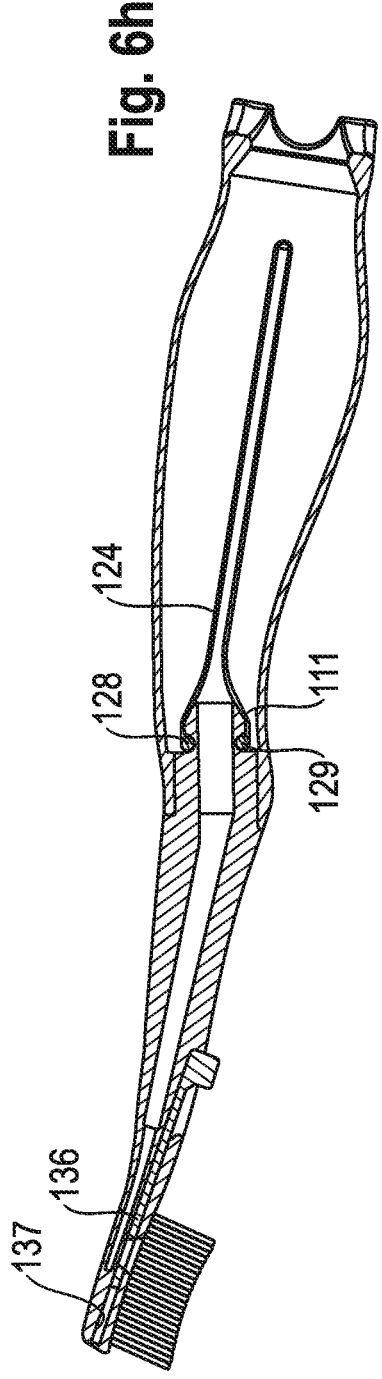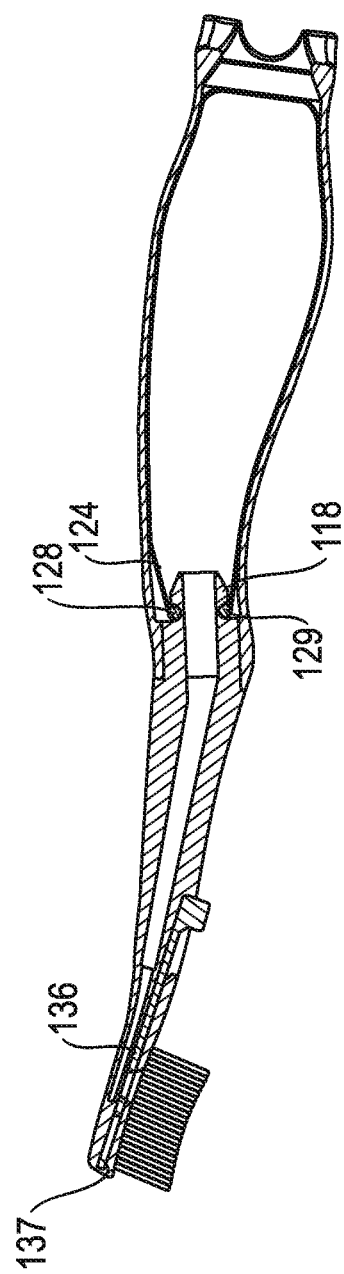

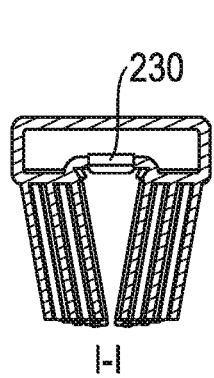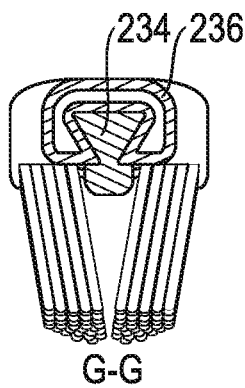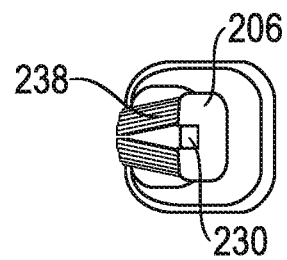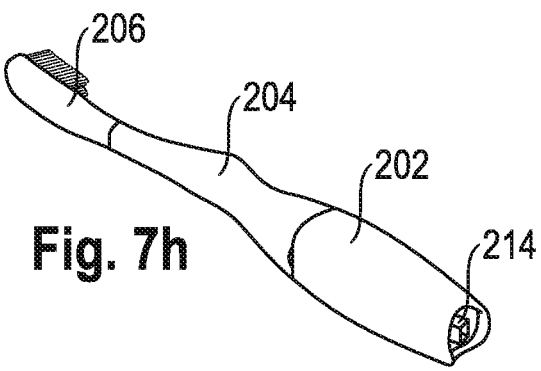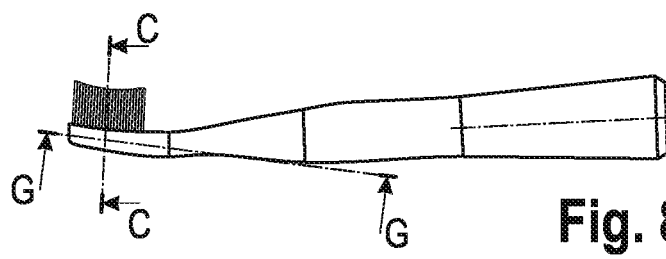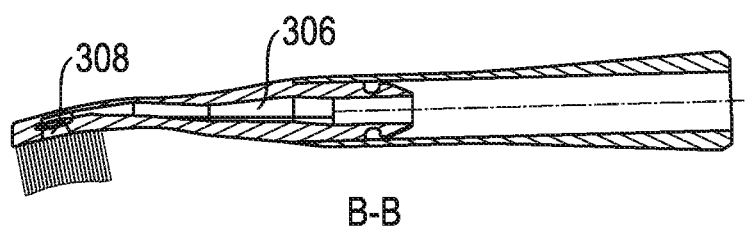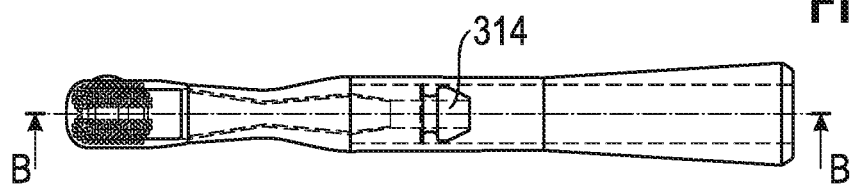

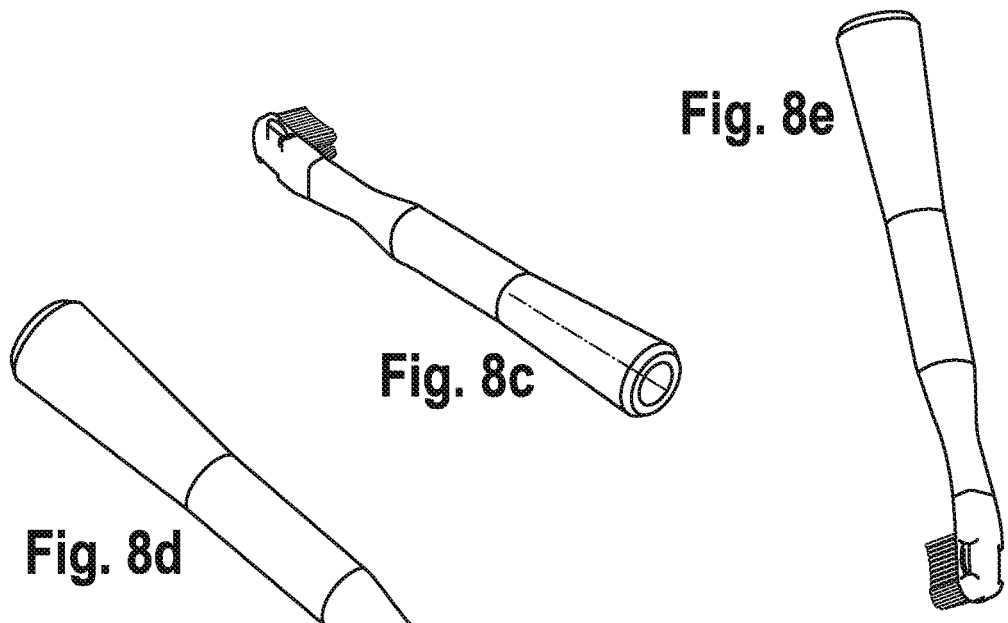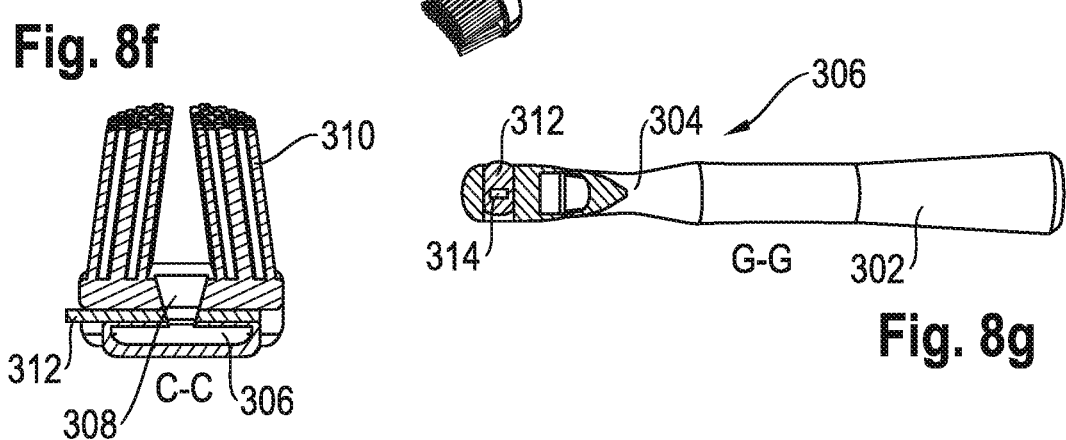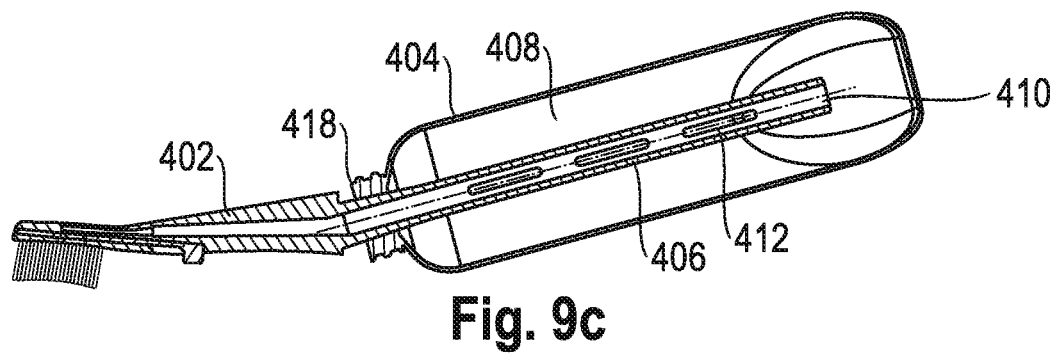

TOOTHBRUSH

CROSS REFERENCE TO RELATED INVENTION

This application is a national stage application pursuant to 35 U.S.C. § 371 of International Application No. PCT/EP2016/074078, filed Oct. 7, 2016, which claims priority to German Utility Application No. 20 2015 105 354.1, filed Oct. 9, 2015, the entire contents of which are hereby incorporated by reference.

BACKGROUND

The present invention relates to a toothbrush with a handle section and a brush head.

Toothbrushes exist in a wide variety of forms, colors, lengths and configurations. The brush head of the toothbrush can have an electric drive and have brushes in different degrees of hardness. Toothbrushes are generally used together with toothpaste, in particular in the form of toothpaste or other tooth cleaning agents. Tooth bleaching agents and other cosmetically or medically active agents are also referred to below as toothpaste. These are usually applied to the brush head from a separate tube or another storage container. This application is complicated, time-consuming and repeatedly leads to the toothpaste dropping from the brush head and having to be applied again.

US 2012/0103355 A1 discloses a toothbrush with a dispenser for toothpaste. The toothbrush has a handle section and a brush head. The brush head has an outlet opening, which is connected to a toothpaste supply via a channel. The toothpaste supply has a chamber for receiving the toothpaste, in which a threaded spindle that can be rotated by means of an adjusting wheel is arranged. An adjusting plate can be displaced along the spindle by means of the threaded spindle, in order to press toothpaste through the channel into the brush head by means of a volume reduction.

A toothbrush with a reservoir that is pivotably mounted in the handle is disclosed in WO 2011/035011. In a first position, the contents of the reservoir are not connected to the channel and toothpaste cannot be introduced into the reservoir of the brush head. In a second position, a closure on the reservoir is opened wherein toothpaste can be conveyed through the channel into the brush head by applying pressure to the reservoir.

A toothbrush is disclosed in WO 2004/088547, the toothpaste supply of which can be inserted into a cartridge having two different tooth cleaning agents.

US 2011/0067193 A1 discloses a toothbrush with a cavity in the handle, wherein the cavity has an inlet opening. The reservoir has a size in order to receive a sufficient quantity of toothpaste and to dispense it to the brush head. The delivery takes place via pressure on an elastically formed section of the toothbrush.

DE 103 37 062 A1 discloses a toothbrush with a toothbrush head and toothpaste container. The toothpaste container has a handle shell part, wherein a toothpaste container inserted into the handle part forms a part of the outer surface of the handle, wherein toothpaste can be pressed out by pressure on the soft elastic toothpaste container.

DE 10 200 5 033 571 A1 discloses a toothbrush with an integrated tooth cleaning means, in which a pump mechanism is provided for conveying the tooth cleaning agent from the storage container to the brush head.

A toothbrush with contained toothpaste is known from DE 20 2005 006 568 U1, which is conveyed via a metering piston, the position of which can be adjusted on the handle.

US 2007/0041779 A1 discloses a toothbrush with a manual and electric pump for dispensing toothpaste.

In the use of the known toothbrushes with a toothpaste supply integrated into the handle, the question is always established how and how precise the quantity of toothpaste can be metered onto the brush head.

BRIEF SUMMARY OF THE INVENTION

The invention is based on the object of providing a toothbrush, in which the possibility is provided by simple means for the user to meter the desired amount of toothpaste as accurately as possible.

The toothbrush according to the invention comprises a handle section and a brush head. The brush head has at least one outlet opening, from which toothpaste can emerge. Toothpaste is understood hereinafter as a generic term and comprises any flowable, liquid and/or pasty tooth cleaning agent and/or tooth treatment agent. The at least one outlet opening is connected to a toothpaste supply in the handle section via a channel. According to the invention, toothpaste supply, channel and outlet opening are matched to one another in such a way that toothpaste can be conveyed from the toothpaste supply via the channel to the at least one outlet opening via a suction process carried out by the user's mouth. For the oral suction process the user surrounds the head of the toothbrush according to the invention and carries out a slight suction movement by means of which toothpaste is sucked in from the toothpaste supply via the channel. In order to obtain a sufficient quantity of toothpaste with a conventional suction pressure toothpaste supply, channel and outlet opening are matched to one another in a corresponding manner. For this purpose, for example, the geometry and/or diameter of the channel and the outlet opening are designed for a slight passage of the toothpaste. The surface structure having, for example, a smooth or a rough surface also has an influence on the suction pressure. A supporting pressure for conveying and dosing the toothpaste can also be provided by means of a pressure device. The advantage of the toothbrush according to the invention lies—in addition to the precise dosing which an user can execute with the mouth—also in that an user can comfortably carry out the operation of cleaning his teeth with one hand and does not have to change his grip, for example in order to convey toothpaste from the toothpaste supply onto the brush head by pressing on a storage container or rotating a wheel on the handle part. The toothbrush according to the invention can be designed with or without an electric drive.

In a preferred embodiment, the toothbrush according to the invention is equipped with a pressure device, via which a pressure supporting the suction process is exerted on the toothpaste almost on all sides. In order to apply the supporting pressure, the pressure device preferably comprises an elastic balloon filled with the toothpaste. The elastic balloon generates a pressure on the toothpaste, so that the toothpaste is conveyed entirely or partially through the channel to the outlet opening. The user can easily meter the delivered amount of toothpaste at the outlet opening. The supporting pressure from the pressure device can be designed in this case in such a way that the toothpaste does not exit from the outlet opening without a suction process, or such that the toothpaste emerges independently and the exit quantity and speed is increased by the suction process.

In a preferred embodiment, a toothpaste cartridge is provided for the toothbrush. This embodiment forms a set consisting of a toothbrush according to the invention and at least one toothpaste cartridge. The toothpaste cartridge is designed in order to be arranged in the toothpaste supply for connection to the channel leading to the outlet opening. The advantage of using a toothpaste cartridge lies therein that different cartridges with different tastes and the like can be provided exchangeable in the handle section. The toothpaste cartridges can be refillable or designed as a disposable cartridge, the elastic balloon can also be arranged in the cartridge.

In another embodiment the toothpaste cartridge has a tamper-evident closure, wherein means for perforating the tamper-evident closure are arranged in the toothpaste supply or on the brush head. The tamper-evident closure can consist, for example, of a thin aluminium or plastic membrane, which can be pierced with the aid of a mandrel, a hollow mandrel or comparable means arranged in the toothpaste supply or on the brush head. Of course, the dimensions for the connection of the cartridge are selected in this case as well, the toothpaste can be removed from the cartridge even at a moderate suction pressure.

In a preferred embodiment of the toothbrush, the pressure device comprises at least one elastic pressure region in the handle section. In the pressure region, the volume of the toothpaste supply is reduced by pressure. While an elastic balloon exerts a pressure on the toothpaste as a pressure device by means of its material and its expanded state, the possibility is created in the configuration with pressure regions in the handle section to selectively, manually exert a supporting pressure which facilitates the removal and metering of the toothpaste by means of the suction process.

In a further development of this embodiment, the grip portion can be completely made of an elastic material, which has a shape memory, for example a thermoplastic. As a result, the handle section can be designed, for example, in the shape of a tube, wherein toothpaste is conveyed in a supporting manner onto the tube by pressing and the tube returns to the original shape after releasing the pressure. The outer sleeve thus formed is stable enough, in order to be able to be used as in a conventional toothbrush handle for performing the function of the toothbrush. The shape and the dimensions can correspond to those of a conventional toothbrush.

In addition, the outer sleeve is elastic enough to be compressed at each point, as a result of which toothpaste is conveyed into the toothbrush head. The stiffness of the outer shell is not impaired by the pressure regions as much that the grip part loses its shape when the toothpaste supply continues to empty. Also, a supporting device may be provided in the interior of the elastic outer sleeve, for example in the form of struts or a skeleton. The aim of the support device is to ensure sufficient rigidity for handling during the cleaning process even in the case of a largely emptied toothpaste supply.

In a preferred embodiment, the brush head is provided with a tubular outlet channel, which protrudes into the toothpaste supply. Regarding a handle section which consists entirely or partially of an elastic material, the tubular outlet channel can also take over the function of a support device for the handle section. Toothpaste is supplied via the tubular outlet channel from the toothpaste supply. In a particularly preferred embodiment, the tubular outlet channel is connected to an outlet opening of the toothpaste supply via a conical-cone-connection. The conical-cone-connection has the particular advantage that the outlet opening of the toothpaste supply is closed in a sealing manner. A further advantage lies in the fact that, in the case of the conical-cone-connection, only an inner diameter of the outlet opening from the toothpaste supply is of relevance and therefore the tubular outlet channel can be inserted into outlet openings of different diameters.

In a preferred embodiment, the outlet opening for the toothpaste is arranged in the region of the brush head on the side facing away from the brushes. The advantage of this arrangement lies in the fact that the geometry of the brush arrangement is not influenced by the outlet opening and the outlet opening can be produced in a size adapted to the suction pressure. Alternatively, the outlet opening in the brush head can also be arranged between the brushes, wherein preferably adjacent brushes are arranged inclined relative to the outlet opening. In that the brushes adjoining the outlet opening are arranged in an inclined manner, the outlet opening for the toothpaste is visually concealed. In addition, the toothpaste is discharged through the brushes, which ensures a uniform distribution of the toothpaste.

In a further preferred embodiment, the handle section and the brush head can be connected to one another via a plug-in rotary connection. The plug-in rotary connection makes it possible, in a simple manner, to exchange the handle section, for example with the toothpaste supply, and the brush head. The plug-in rotary connection comprises a drag for the rotational and/or plugging movement, which is sufficiently large for the use of the brush head on the one hand and is sufficiently small on the other hand, in order to open the plug-in rotary connection with a simple manual movement. In addition, a lock can be provided with the aid of a push button. The plug-in rotary connection is preferably designed as a bayonet closure, a threaded- or conical-cone-connection is formed. A conical-cone-connection is preferred with regard to angular stability and tightness.

In a preferred embodiment, the toothbrush has in its handle section a holding section for a second brush head. The second brush head can be arranged, for example, within the handle section and serves to replace the first brush head when required. The first and second brush heads are preferably of the same design.

In a preferred development, a shut-off device is provided which closes the outlet opening. The shut-off device performs the function of blocking further exiting toothpaste and at the same time also preventing an escape or drying of the toothpaste in the outlet opening. The shut-off device can be designed as a valve, a slide or a cock. The shut-off device has a valve which, for example, moves substantially in the flow direction of the toothpaste, can consist of a slide plate guided in the brush head. The slide plate can be provided with an opening. By adjusting the shut-off member relative to the outlet opening of the channel, it is possible to block or release the outlet channel.

In a preferred embodiment, an actuating member is formed on the shut-off member guided in the brush head. The actuating member is provided in a neck section between the brush head and the handle section. Alternatively or additionally, the actuating member can also be arranged only on the brush head, preferably laterally, on the brush head. In an expedient refinement, the actuating member and the shut-off member are formed in one piece. By means of which actuating member, the shut-off member is placed and the outlet channel for the toothpaste is opened or closed.

An important aspect is to prevent the toothpaste supply from drying out, wherefore the shut-off member has two sealing surfaces in the brush head between which the shut-off member is guided on both sides. The shut-off member is located in the manner of a sandwich between the two sealing surfaces and moves relative thereto. An adequate seal for the shut-off member is achieved by means of two opposing sealing surfaces, which reliably prevent the toothpaste supply from drying out.

In summary the shut-off member is guided in a rotating and/or sliding manner relative to the brush head in the manner of a sandwich, wherein the shut-off member has a planar, cylindrical, frustoconical, ball-shaped or other rotationally-surface-shaped contact surface. A geometry which is in the form of a rotational surface is understood to mean a geometry which can be generated by rotating a generating device about a fixed axis. In addition to the two alternatives of a rotating and a pushing movement of the shut-off member, combinations of rotating and pushing actuation of the shut-off member are also possible in all brush combinations. For example, the shut-off member can consist of a circular-cylindrical body, which is arranged between an inner and an outer cylinder of the brush head. Such a cylindrical shut-off member can be moved in a rotating and sliding manner between the two cylinders, for example along a helical line.

In addition to the configuration of the shut-off valve and a valve, embodiments with a shut-off cock are also conceivable, of course, in which the shut-off member rotationally closes the outlet opening or associated channel. The valve and the slide can also be arranged at an angle to the flow direction of the medium. The possible embodiments of the valve, slide and also tap can be summarized by the concept of the control surface: a control surface is the sealing or contacting surface on the shut-off device. The control surface can be produced by a rotating or a translational movement of a generating contour in the shut-off device. A straight line which rotates at an angle produces, for example, a cone, while a straight line which is moved in a translatory manner generates a plane. Each possible shut-off device can thus be produced by combination of these.

In a preferred embodiment, the toothbrush according to the invention can also be provided with an electric drive for the brush head. The electric drive can be, for example, an electric motor which is positioned, for example, in the handle section of the toothbrush. Depending on the design, the electric drive can slightly vibrate the entire toothbrush thereby supporting the cleaning of the teeth or move the brush head relative to the handle section.

Toothpaste behaves as a rule like a non-newtonian liquid, the flow properties of which can be improved by vibrations and slight vibrations. In a preferred embodiment, a vibration element can therefore be provided in the handle section of the toothbrush, which interacts with the toothpaste supply and changes its flow property by means of vibrations introduced into the toothpaste.

In order to electrically supply the drive and/or the vibration element, a solar element can be provided, which completely or partially surrounds the electrical supply pick-up. The invention relates to a small-scale energy store, such as, for example, a capacitor or an accumulator, the energy of the solar cell can be stored and made available for the electrical consumption. The solar element is preferably designed such that it generates sufficient electrical power even in the case of artificial light.

BRIEF DESCRIPTION OF THE DRAWINGS

A preferred embodiment is explained in more detail below.

FIG. 1 is a cross section through a toothbrush according to the invention,

FIG. 2 is a side view of the toothbrush according to the invention,

FIG. 3 is a side view of the toothbrush from FIG. 2 with an opened cover,

FIG. 4 a schematic view of a cartridge for toothpaste,

FIGS. 6-6h illustrate a further embodiment of the toothbrush according to the invention comprising a two-part structure comprising a handle section and a brush head and a valve in the brush head, FIGS. 8-8g illustrate a further variant of the toothbrush with a brush head and a timed shut-off slide in the brush head and FIGS. 9-9e illustrate a further embodiment of the toothbrush having a tubular handle section.

DETAILED DESCRIPTION OF THE INVENTION

Figure 5A:
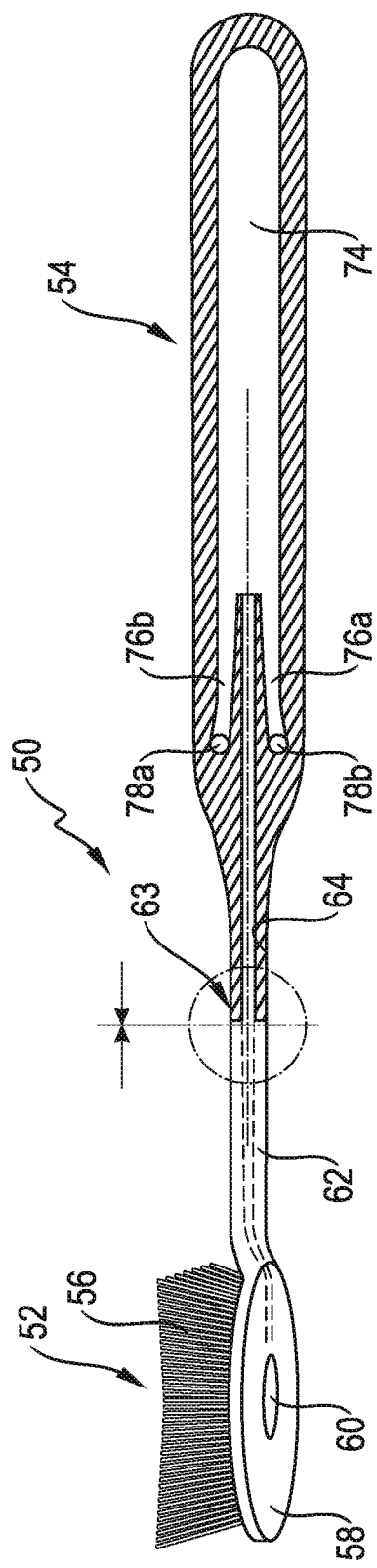
FIGS. 5a-5b illustrate an alternative embodiment of the toothbrush according to the invention comprising openings in the handle and a rotary latch in a detailed view.

FIG. 1 shows a toothbrush 10 in a central sectional view along the longitudinal direction. The toothbrush 10 has a brush head 12 and a handle section 14. The brush head 12 has a bristle head 18 equipped with bristles 16, which merges into the handle section 14 via a handle 20. In the bristle head 18 outlet openings 22 are provided between bristles 16. The outlet openings 22 are connected to a channel 24 which extends through the handle 20 into a toothpaste supply 26. In the exemplary embodiment illustrated, the outlet opening 22 extends at an approximately right angle with respect to the channel 24. The diameter and angular position of the outlet opening are selected, in this case, in such a way that toothpaste can be removed from the toothpaste supply 26 with the aid of a suction process. The toothpaste supply 26 can be closed by means of a flap 28 provided with a snap-action closure.

FIG. 2 shows the toothbrush of FIG. 1 in a view from the side when the flap is closed. The flap 28 has at one end, for example, a projection 29, via which the flap can be grasped for opening or closing. In addition, the flap 28 can be designed, for example, with a latching or snap-action closure, so that the flap 28 can be secured in a position closing the toothpaste supply. FIG. 2 also shows that the handle section 14 has a larger diameter than, for example, the handle 20 of the toothbrush. As a result, for example, an electric drive 30 can be provided for actuating the brush head 12.

FIG. 3 shows the toothbrush from FIG. 2 when the flap 28 is open, as a result of which a view into the toothpaste supply 26 is enabled. The structure of the toothbrush can be very different depending on the technology used. In FIG. 1, for example, a toothbrush which is formed in one piece and has a toothpaste supply in the handle section is shown. FIGS. 2 And 3 show an embodiment of the toothbrush according to the invention, in which a two-part design is possible. In the two-part design, the brush head can be replaced. In this case a stem section usually also belongs to the brush head. The toothbrush can also be constructed in a very different manner with regard to its use and its drive.

FIG. 4 shows a cartridge 32 made of an elastic film material. The film material is welded and closed along a seam 34. On the opposite side, a connection 36 is provided, which protrudes from the cartridge 32 as a connection piece. The connection 36 is brought into contact with the connection centre in the grip part of the toothbrush in order to be able to convey toothpaste. In the case of the illustrated cartridge 32, the film material is designed to be flexible so that during the removal of toothpaste from the cartridge 32 the film bag collapses and no negative pressure is built up. If a cartridge 32 for the toothpaste has a rigid body which cannot reduce its volume with the removal of the toothpaste, the rigid body is provided with a pressure compensation device.

In a preferred embodiment, a forward movement can be generated, for example, by folding the flap 28 onto the cartridge 32, which develops so much pressure that the connection 36 is pierced. For this purpose, for example, a spike can be provided in the interior of the toothbrush which establishes a connection to the channel. One or more outlet openings are provided in the brush head itself between the individual brush openings. The consistency of the toothpaste contained in the cartridge 32 is slightly solid, but pasty, flowable, comparable to a yoghurt product and is conveyed to the brush head by a suction movement. The quantity of the sucked-in toothpaste is determined by the duration of the suction process. It has been found to be particularly advantageous that additional tooth paste can be extracted during the dental cleaning process.

FIG. 5a shows a toothbrush 50 with a brush head 52 and a handle section 54. The brush head 52 has bristles 56 on a bristle head 58 the VDT the bristle head 58 has a suction opening 60 on the side facing away from the bristles 56. The bristle head 58 merges into a bristle neck 62, which is connected to a protruding section 64 of the handle section 54 via a rotary closure 63.

Figure 5B:
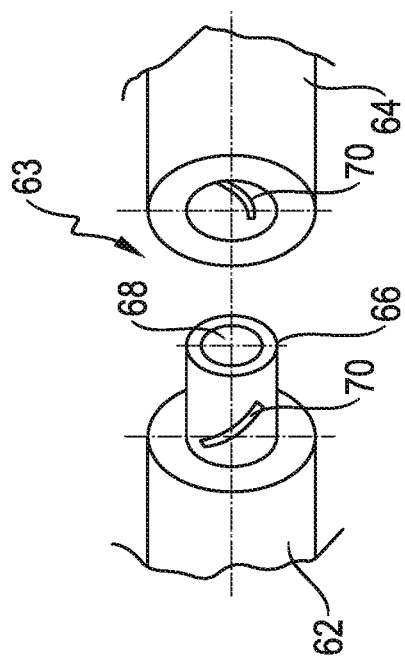

The detailed view in FIG. 5b shows a protruding circular cylindrical projection 66, which in its interior guides a toothpaste channel 68. The circular cylindrical projection 66 has a threaded section 70 on its outer side, by means of which the brush head 52 can be fastened to the handle section 54 by means of a rotary connection. The connecting section 64 of the handle section 54 has a circular receptacle, which is adapted in its diameter to the outer diameter of the circular-cylindrical projection 66. Located in the interior of the opening is a corresponding threaded portion 72, which interacts with the threaded portion 70 in the event of a closure. A snap-action or latching position can be achieved by means of a projection. In the connected position, the channel 68 is continuously connected to the toothpaste supply 74 in the interior of the handle section 54.

The handle section 54 has a toothpaste supply 74 which is connected to the environment via two ventilation ducts 76a, 76b. The ventilation ducts 76a, 76b have openings 78a, 78b at their ends, which are arranged on the side of the handle section 54 facing the brush head 52. In the embodiment shown, the toothpaste supply 74 is filled directly with toothpaste, without a toothpaste cartridge being provided. The handle section is replaced as a whole when the toothpaste is to be exchanged, for example for reasons of taste or consumption.

FIG. 6 shows a view from the side of a preferred embodiment of the toothbrush according to the invention. The toothbrush has a handle part 102 and a brush head 104. The brush head 104 merges into a neck section 106, which is detachably connected to the handle section 102. The handle section 102 has four foot bases 108 onto which the toothbrush 100 can be placed. In the side view of FIG. 6 an actuating projection 110 is visible by means of which a shut-off valve can be closed on the brush head 104.

FIG. 6b shows a rear view on which the feet 108a-d can be seen. FIG. 6a shows a section along the line A-A from FIG. 6b. The handle section 102, which encloses an essentially cylindrical toothpaste supply, can be seen in said section. The grip part 102 is placed on a connecting section 114 of the neck section 106. In the exemplary embodiment illustrated, the connection between the connecting section 114 and the handle section 102 is effected in a frictionally locking manner. In principle, however, a thread, a bayonet lock or a snap connection can also be provided here.

The neck section 106 has a mushroom-shaped fastening section 116 on its end projecting into the handle section 102. The fastening section 116 has a head 118, which has a larger diameter than a neck section 120. An outlet channel 122 extends through the fastening section 116. The fastening section 116 serves to fasten an elastic balloon 124 to its outlet opening 128. The elastic balloon 124 is filled with toothpaste and elastically expanded by the same. Due to its expansion and the force applied almost on all sides to the toothpaste, there is an increased pressure for the toothpaste at the balloon opening.

The balloon 124 is placed with its opening 128 onto the fastening section 116, wherein the balloon opening 128 is stretched over the head 118 and held in the connecting neck section 120.

The connecting channel 122 opens into the brush head 104. On the side facing the bristles 130, the outlet channel 122 has an outlet opening 132. The section along the line C-C from FIG. 6a is illustrated in FIG. 6e. In said section, it can be seen how the outlet channel 122 merges into the conically widening outlet opening 132. The outlet opening 132 is concealed by the bristles by being inclined inwards towards the centre of the brush head.

The actuating projection 110 actuates a slide plate 136. The slide plate 136 is two-sided; this means that the two flat sides thereof are guided in the brush head 104 in a sealing manner in the manner of a sandwich. This two-sided guide ensures sufficient tightness of the advanced slide plate 136, as a result of which the toothpaste is prevented from drying out in the handle part 102 or in the balloon 124. In its advanced position, the slide plate 136 is advanced into a closed housing pocket 137 (FIGS. 1, 6g-6h). The closed housing pocket 137 (FIGS. 1, 6g-6h) accommodates the slide plate in its closed position.

As can be seen in FIG. 6e, the opening 138 in the slide plate 136 is aligned with the conically expanding outlet opening 132 of the slide plate 136. FIG. 6f shows the section along the line B-B from FIG. 6a wherein the two-sided guide of the slide plate 136 in the brush head 104 is visible.

FIGS. 6c and 6d show the particular ergonomic design of the toothbrush 100. The handle 102 has a bulging shape, by means of which the gripping is facilitated. The latter can also be guided particularly easily via a waist 140 and a bulge 142 on the neck of the toothbrush 100.

FIG. 6g shows the balloon 124 in its position placed on the head 118. The balloon opening 128 has a circumferential edge 129 in which a material thickening is present. The circumferential edge 129 is attached to the connecting neck 120 in a lacing manner. Due to the widening of the head 118 relative to the connection neck 120, a detachable, but a very firm connection between the head 118 and the balloon 124 is created. FIG. 6h shows the configuration from FIG. 6g with a non-filled balloon 124. The balloon 124 is held in the non-filled state as well by the conical geometry of the head 118.

Figure 7:
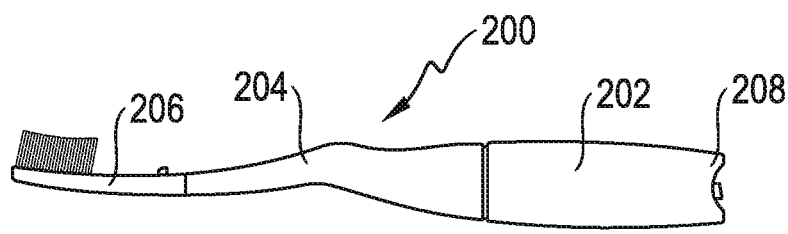
FIGS. 7-7g illustrate a further embodiment of the toothbrush having a brush head and a two-part handle section and a valve in a brush head.

A further embodiment is represented in FIG. 7-h. The toothbrush 200 shown in FIG. 7 has a structure which is very similar in shape to the toothbrush 100. The toothbrush 200 comprises a two-part handle section 202, 204 which parts are detachably connected to one another. The brush head 206 is placed on the second handle part 204. FIG. 7b shows the structure of the toothbrush 200, wherein a two-part design of the handle section with the parts 202 and 204 can be seen more clearly. The first handle section 202 extends from a foot end, which is provided with three stand-up feet 208, approximately over one third of the total length. This is adjoined by the second part of the handle section 204, which has a waist 210 for better guiding of the toothbrush 200.

Figure 7A:
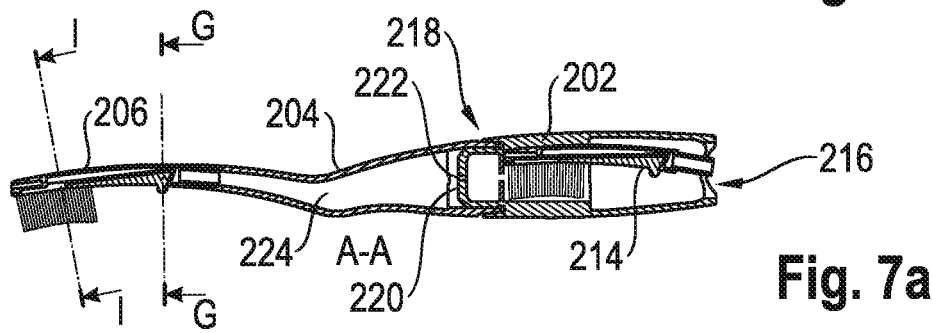
Figure 7B:
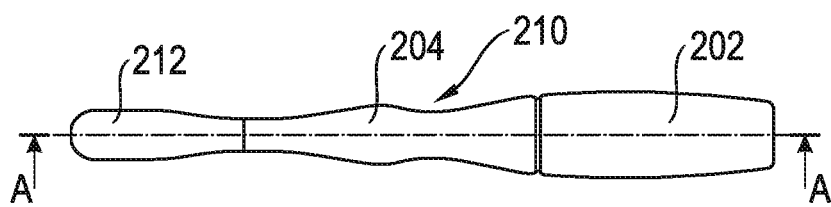

FIG. 7a shows a section along the line A-A from FIG. 7b. Said section shows that the first part of the handle section 202 is open towards the foot of the toothbrush 200 and can accommodate a second brush head 214. The second brush head 214 can be received via the end 216 which is open at the foot. The second section 204 of the handle section is connected to the first handle section 202 via a frictional connection section 218.

For the frictional connection section 218, a cylindrical projection 220 is formed on the first part of the handle section 202. The cylindrical projection 220 is inserted into a connecting opening of the second handle section 204, in order to generate the frictional connection 218 in this way. The cylindrical section 220 has a centrally arranged bore 222, via which a pressure compensation can be made with the toothpaste supply 224.

Figure 7C:
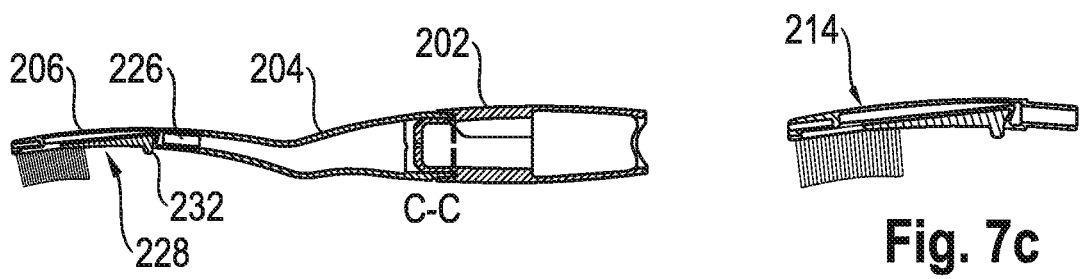
Figure 7D:
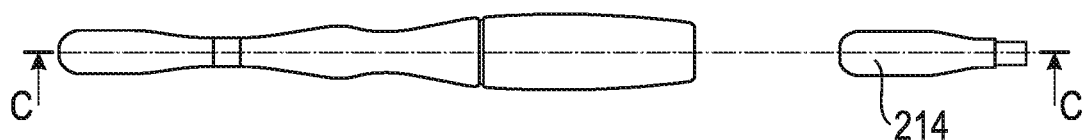
Figure 9B:
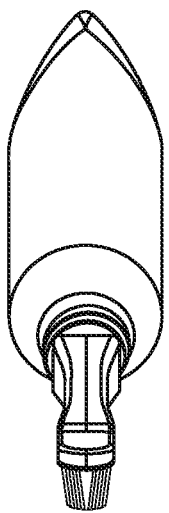
Figure 9E:
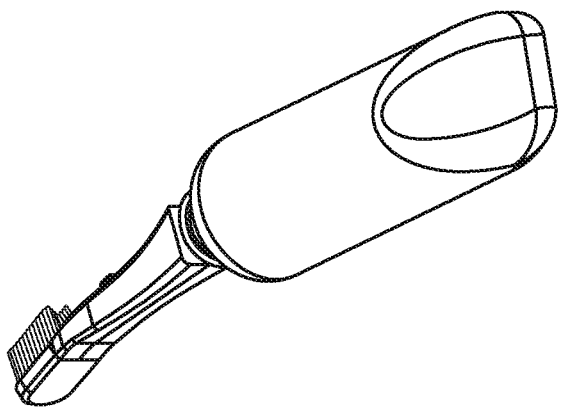
Figure 9A:
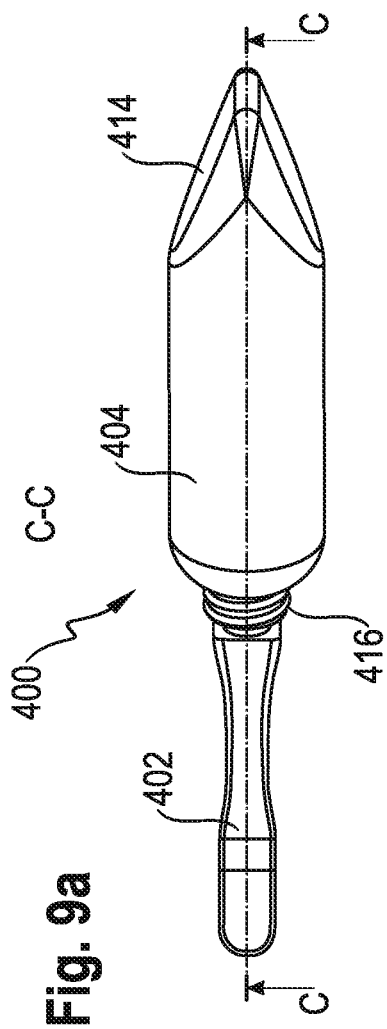
Figure 9D:
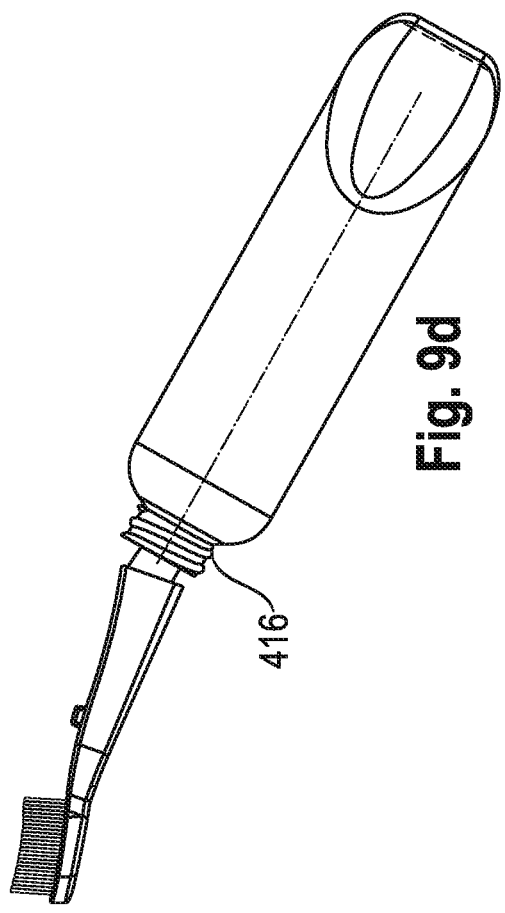

The brush head 206 is inserted with a projecting connecting section 226 onto the second handle part 204 (see FIG. 7c) in this case, the connecting section 226 forms with the outlet channel for the toothpaste stored in the toothpaste supply 224. The outlet channel continues in the brush head 206, wherein a sliding valve is provided, with which an outlet opening 230 can be closed. The sliding valve 228 has a protruding actuating member 232. The valve body 234 is advanced via the actuating member 232 in order to close the outlet opening 230. FIG. 7f shows a section along the line G-G from FIG. 7a. It can be clearly seen that the valve body 234 widens towards its side pointing away from the bristles 238. This results in a dovetail joint. The locking body 234 is held by a wall 236 surrounding the outlet channel. The outlet opening 230 is closed by advancing the actuating member.

FIG. 7g shows a top view of the brush head 206 with the outlet opening 230, wherein it can be seen that the adjacent bristles 238 are inclined towards the outlet opening 230. FIG. 7h shows a rear view of the toothbrush 200 with the second brush head 214 inserted.

FIG. 8 shows a further embodiment of a toothbrush with a handle part 302 and a brush head 304. The essential difference to the embodiment from FIG. 6 lies in the shut-off device for the outlet channel 306. The channel 306 opens into an outlet opening 308, which is surrounded by inclined bristles 310. The outlet opening 308 is closed in the region of the brush head 304 by means of a laterally actuated slide 312 (FIG. 8f-8g). The slider 312 (FIG. 8f-8g) has a fastening section 314 which is aligned with the conical outlet opening 308 in a particular position (FIG. 8). As shown in the sectional representation of FIG. 8g along the line G-G in FIG. 8, the slide 312 can be displaced laterally transversely to the longitudinal direction of the toothbrush. As a result, the outlet opening 308 of the outlet channel 306 can be closed.

The model shown in FIG. 8 is again provided and intended for using an elastic balloon 124, which is pulled onto a fastening section 314. The elastic balloon 124 consists of an elastomer material, which is expanded its toothpaste filling and presses the toothpaste into the channel 306 at a predetermined pressure. By using a balloon having a toothpaste supply, the handle part 302 can be designed to be open at its foot end.

FIG. 9 shows an embodiment of the toothbrush 400 according to the invention, which has a brush head 402 and a handle section 404. FIG. 9c shows a sectional view along the line C-C from FIG. 9a. In said sectional view, it can be seen that the brush head 402 has a tubular outlet channel 406, which protrudes into the toothpaste supply 408 in the handle section 404. The brush head 402 is connected to the handle section 404 via a conical-cone connection. With the conical seat formed in this way, good tightness and strength are achieved. The channel 406 has an entry opening 410 at its end. In addition, openings 412 extending in the longitudinal direction are provided through which toothpaste can enter the outlet channel 406 laterally. The handle section 404 is formed by a tube with a wedge-shaped end 414. At the opposite end, a screw thread 416 is provided, onto which a cover (not shown) with an internal thread can be screwed when the tube is not used as a toothbrush 400. The brush head 402 is placed on the opening 418 by means of the conical-cone connection, as a result of which no adaptation to the thread 416 is required, but only to the diameter of the outlet channel.

The brush head 402 is constructed in exactly the same way on its portion protruding from the handle section 404 like the brush head from the exemplary embodiment according to FIG. 6. Of course, the configuration from FIG. 7 or the FIG. 8 could also be combined with the handle section 404.

LIST OF REFERENCE NUMERALS

10 Toothbrush
12 Brush head
14 Handle section
16 Bristles
18 Bristle head
20 Handle
22 Outlet opening
24 Channel
26 Toothpaste supply
28 Flap
29 Projection
30 Electric drive
32 Cartridge
34 Suture
36 Connection
50 Toothbrush
52 Brush head
54 Handle section
56 Bristles
58 Bristle head
60 Suction opening
62 Bristle neck
63 Rotary shutter
64 Portion of grip portion 66 protrusion
68 Toothpaste channel
70 Threaded section
72 Threaded section
74 Toothpaste stock
76a,b Ventilation channel
78a,b Opening
102 Handle part
104 Brush head 106 Neck section
108 Foot base
110 Operating section
112 Toothpaste supply
114 Connecting section
116 Fastening section
118 Head
120 Neck section
122 Exit channel
124 Balloon
128 Connection opening
130 Bristles
132 Outlet opening
136 Slide Plate
140 Waist
142 Bulge
200 Toothbrush
202 Handle part
204 Handle part
206 Brush head
208 Stand-up feet
210 Waist
214 Brush head
216 Open end
218 Connection section
220 Projection
222 Bore
224 Toothpaste supply
226 Connection section
228 Sliding valve
230 Outlet opening
232 Actuation member
234 Valve body
300 Toothbrush
302 Handle part
304 Brush head
306 Exit channel
308 Outlet opening
310 Bristles
312 Slider
314 Break-through
400 Toothbrush
402 Brush head
404 Handle section
406 Exit channel
408 Toothpaste supply
410 Entrance opening
412 Openings
414 Wedge-shaped end
416 Screw Threads
418 Openings

The invention claimed is:

1. A toothbrush comprising:
a handle section comprising a channel;
a brush head comprising at least one outlet opening fluidly coupled to one end of the channel; and
a toothpaste supply positioned in the handle section and fluidly coupled to an opposing end of the channel,
wherein toothpaste can be conveyed from the toothpaste supply via the channel to the at least one outlet opening using a suction process carried out with a mouth of a user,
wherein the handle section comprises a holding section for a second brush head, and
wherein the brush head further comprises a sliding valve configured to close the at least one outlet opening.

2. The toothbrush according to claim 1, further comprising an electric drive.

3. The toothbrush according to claim 2, further comprising an electric vibration element configured to vibrate the toothpaste supply.

4. The toothbrush according to claim 3, further comprising a solar element configured to at least partially power the electric drive and the electric vibration element.

5. The toothbrush according to claim 1, wherein the handle section comprises a first handle portion and a second handle portion, wherein the first handle portion and the second handle portion are configured to detachably connect to each other via a friction connection.

6. The toothbrush according to claim 5, wherein the brush head is positioned on the second handle portion and the first handle portion comprises a foot end configured to enable the toothbrush to stand upright on a surface.

7. A toothbrush comprising:
a handle section comprising a channel;
a brush head comprising at least one outlet opening fluidly coupled to one end of the channel and a sliding valve configured to close the at least one outlet opening, wherein the sliding valve comprises,
a valve body, and
an actuating member configured to advance the valve body to close the at least one outlet opening; and
a toothpaste supply positioned in the handle section and fluidly coupled to an opposing end of the channel,
wherein toothpaste can be conveyed from the toothpaste supply via the channel to the at least one outlet opening using a suction process carried out with a mouth of a user, and
wherein the handle section comprises a holding section for a second brush head.

8. The toothbrush according to claim 7, further comprising an electric drive.

9. The toothbrush according to claim 8, further comprising an electric vibration element configured to vibrate the toothpaste supply.

10. A toothbrush comprising:
a handle section comprising a channel;
a brush head comprising at least one outlet opening fluidly coupled to one end of the channel and a sliding valve configured to close the at least one outlet opening, wherein the sliding valve comprises,
a valve body, and
an actuating member configured to advance the valve body to close the at least one outlet opening; and
a toothpaste supply positioned in the handle section and fluidly coupled to an opposing end of the channel,
wherein toothpaste can be conveyed from the toothpaste supply via the channel to the at least one outlet opening using a suction process carried out with a mouth of a user,
wherein the handle section comprises a holding section for a second brush head, and
wherein the actuating member and the valve body are formed as one piece.

* * * * *